United States Patent
Li et al.

(10) Patent No.: US 10,678,789 B2
(45) Date of Patent: Jun. 9, 2020

(54) BATCH DATA QUERY METHOD AND APPARATUS

(71) Applicant: Huawei Technologies Co., Ltd., Shenzhen (CN)

(72) Inventors: Feng Li, Beijing (CN); Yun Zhang, Beijing (CN); Lei Wang, Beijing (CN); Xiaobing Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 15/804,346

(22) Filed: Nov. 6, 2017

(65) Prior Publication Data

US 2018/0060392 A1 Mar. 1, 2018

Related U.S. Application Data

(63) Continuation of application No. PCT/CN2016/074141, filed on Feb. 19, 2016.

(30) Foreign Application Priority Data

May 6, 2015 (CN) .......................... 2015 1 0226374

(51) Int. Cl.
*G06F 16/20* (2019.01)
*G06F 16/2453* (2019.01)
*G06F 16/951* (2019.01)
*G06F 16/00* (2019.01)
*G06F 16/90* (2019.01)

(52) U.S. Cl.
CPC ........ *G06F 16/24542* (2019.01); *G06F 16/00* (2019.01); *G06F 16/951* (2019.01)

(58) Field of Classification Search
None
See application file for complete search history.

(56) References Cited

U.S. PATENT DOCUMENTS

2010/0169381 A1* 7/2010 Faunce ............. G06F 16/24534
707/797
2017/0242888 A1 8/2017 Bommireddipalli et al.

FOREIGN PATENT DOCUMENTS

| CN | 101110030 A | 1/2008 |
| CN | 101221578 A | 7/2008 |

(Continued)

OTHER PUBLICATIONS

Sellis, "Multiple-Query Optimization," ACM Transactions on Database Systems, vol. 13, No. 1, XP058138822, pp. 23-52, ACM, New York, New York (Mar. 1988).

(Continued)

*Primary Examiner* — Kristopher Andersen
(74) *Attorney, Agent, or Firm* — Leydig, Voit & Mayer, Ltd.

(57) ABSTRACT

A batch data query method and apparatus are provided. A data query server determines symbol identifiers of operands in N query statements according to operators and the operands in the N query statements, where the symbol identifiers include version numbers of the operands; determines dependency among the N query statements according to the version numbers of the operands in the N query statements; and then, performs inter-query optimization on the N query statements according to the dependency among the N query statements and a preset optimization rule.

21 Claims, 2 Drawing Sheets

(56) References Cited

FOREIGN PATENT DOCUMENTS

| CN | 102609451 A | 7/2012 |
|---|---|---|
| CN | 102859521 A | 1/2013 |
| CN | 103559300 A | 2/2014 |
| CN | 104036007 A | 9/2014 |
| CN | 104063486 A | 9/2014 |

OTHER PUBLICATIONS

Elmasri et al., "Chapter 19: Algorithms for Query Processing and Optimization," Fundamentals of Database Systems, Sixth Edition, XP009171423, pp. 679-725, Addison-Wesley (2011).

* cited by examiner

BATCH DATA QUERY METHOD AND APPARATUS

CROSS-REFERENCE TO RELATED APPLICATIONS

This application is a continuation of International Application No. PCT/CN2016/074141, filed on Feb. 19, 2016, which claims priority to Chinese Patent Application No. 201510226374.X, filed on May 6, 2015. The disclosures of the aforementioned applications are hereby incorporated by reference in their entireties.

TECHNICAL FIELD

Embodiments of the present invention relate to the field of computer technologies, and in particular, to a batch data query method and apparatus.

BACKGROUND

Currently, in all representative big-data query systems (such as Hive, Shark, and Impala), a single query statement is used as a basic unit for parsing and optimization. Key performance of a big-data query system is query efficiency. However, in a data warehouse batch query scenario, a conventional processing mode of using a single query statement as a basic unit for parsing and optimization has a problem of optimization opportunity shortage. What contrasts sharply with intra-query optimization opportunity shortage is rich inter-query optimization opportunities presented in the data warehouse batch query application scenario. An inter-query optimization opportunity is an optimization opportunity among multiple query statements.

In the prior art, in a batch query application scenario, a specific data record that needs to be accessed in each query is dynamically obtained in a manner such as monitoring and feeding back, in real time, a data record update status in a process of executing a query statement, or executing some functions in the query statement in advance, to determine whether there is a conflict or an intersection set among data records operated in multiple queries, and execute some dynamic optimization based on the foregoing analysis. However, dynamic data dependency related to only a group of input can be collected by monitoring a data record or executing some query functions, and optimization executed based on the dynamic data dependency can be applicable to only a group of specific input. Once the input changes, analysis and optimization need to be re-executed.

SUMMARY

Embodiments of the present invention provide a batch data query method and apparatus, to improve inter-query optimization efficiency and reduce inter-query optimization system overheads.

A first aspect of the present invention provides a batch data query method, including:

receiving N to-be-executed query statements, where N is a positive integer that is not less than 2;

determining symbol identifiers of operands in the N query statements according to operators and the operands in the N query statements, where the operators are used to indicate to-be-performed operations, the operands are used to indicate storage locations of data to be operated by the operators in the N query statements, the symbol identifiers include version numbers of the operands, operands indicating same data have a same version number, operands indicating different data have different version numbers, and the operators include at least a create operator, a destruct operator, a scan operator, and a filesink operator;

determining dependency among the N query statements according to the determined version numbers of the operands in the N query statements;

performing inter-query optimization on the N query statements according to the dependency among the N query statements and a preset optimization rule; and executing an optimized query statement to obtain query results of the N query statements.

With reference to the first aspect, in a first possible implementation manner of the first aspect, the determining symbol identifiers of operands in the N query statements according to operators and the operands in the N query statements includes:

obtaining N logical query plan trees corresponding to the N query statements, where one query statement is corresponding to one logical query plan tree;

adding a symbol identifier to an operand of a first-type operator on the N logical query plan trees, where the first-type operator includes a create operator, a destruct operator, a scan operator, and a filesink operator; and performing the following operation on each of the N logical query plan trees:

adding a symbol identifier to an operand of a second-type operator on a first logical query plan tree according to a topology sequence of the first logical query plan tree, a symbol identifier of an operand of a first-type operator on the first logical query plan tree, and a preset adding rule, where the first logical query plan tree is any one of the N logical query plan trees, and the second-type operator is an operator other than the first-type operator.

With reference to the first possible implementation manner of the first aspect, in a second possible implementation manner of the first aspect, a root node of the first logical query plan tree includes a filesink operator, a leaf node of the first logical query plan tree includes a scan operator, an internal node of the first logical query plan tree includes a second-type operator, a create operator, or a destruct operator, and the internal node is a node other than the leaf node and the root node; and the adding rule includes: performing the following operation on each second-type operator on the first logical query plan tree:

if an operand of a first operator is the same as an operand of a left child node of the first operator, adding, to the operand of the first operator, a symbol identifier that is the same as a symbol identifier of the operand of the left child node of the first operator, where the first operator is any one of second-type operators; or if an operand of a first operator is the same as an operand of a right child node of the first operator, adding, to the operand of the first operator, a symbol identifier that is the same as a symbol identifier of the operand of the right child node of the first operator.

With reference to any one of the first aspect, or the first to the second possible implementation manners of the first aspect, in a third possible implementation manner of the first aspect, the optimization rule includes at least one of the following rules:

deleting a query statement having a same operand version number and a same operator as a first query statement, where the first query statement is any one of the N query statements;

keeping a query sequence of query statements that have flow dependency, and optimizing multiple query statements that have flow dependency to a new query statement, where the flow dependency indicates that a version number of an operand of a filesink operator of a query statement executed is the same as a version number of an operand of another query statement executed subsequently; or combining query statements that have a same operator and overlapped operands.

With reference to the first possible implementation manner of the first aspect, in a fourth possible implementation manner of the first aspect, the symbol identifiers of the operands in the N query statements further include a hot data identifier;

the determining symbol identifiers of operands in the N query statements according to operators and the operands in the N query statements further includes:

collecting statistics of a quantity of times that an operand of each scan operator on the N logical query plan trees is referenced;

determining whether the quantity of times that the operand of each scan operator on the N logical query plan trees is referenced is greater than a hot data threshold; and adding a hot data identifier to an operand that is of a scan operator on the N logical query plan trees and that is referenced for a quantity of times greater than the hot data threshold, where the hot data identifier is used to indicate that data corresponding to an operand with the hot data identifier is hot data; and the method further includes:

concurrently executing, in a process of executing the optimized query statement, optimized query statements that include the hot data identifier and that have no flow dependency or output dependency.

With reference to the first or the fourth possible implementation manner of the first aspect, in a fifth possible implementation manner of the first aspect, the symbol identifiers of the operands in the N query statements further include a start active location and an end active location; and the determining symbol identifiers of operands in the N query statements according to operators and the operands in the N query statements further includes:

determining a start active location of a first operand according to an identifier of a scan operator that references the first operand for the first time and a sequence number of a logical query plan tree on which the scan operator is located, where the first operand is any one of the operands in the N query statements; and determining an end active location of the first operand according to an identifier of a destruct operator used for destructing the first operand and a sequence number of a logical query plan tree on which the destruct operator is located; and the method further includes:

releasing, according to the end active location of the first operand in the process of executing the optimized query statement, data storage space indicated by the first operand.

With reference to the fifth possible implementation manner of the first aspect, in a sixth possible implementation manner of the first aspect, the determining symbol identifiers of operands in the N query statements according to operators and the operands in the N query statements further includes:

determining a start active location of a second operand according to an identifier of a first filesink operator that references the second operand for the first time and a sequence number of a logical query plan tree on which the first filesink operator is located, where the first filesink operator is used for writing data to a storage location indicated by the second operand, and the second operand is any one of the operands in the N query statements; and determining an end active location of the second operand according to an identifier of a second filesink operator that references the second operand and a sequence number of a logical query plan tree on which the second filesink operator is located, where the second filesink operator is used for rewriting the data that is operated by the first filesink operator and that is corresponding to the second operand; and the method further includes:

releasing, according to the end active location of the second operand in the process of executing the optimized query statement, data storage space indicated by the second operand.

A second aspect of the present invention provides a data query server, including:

a receiving module, configured to receive N to-be-executed query statements, where N is a positive integer that is not less than 2;

an identifier determining module, configured to determine symbol identifiers of operands in the N query statements according to operators and the operands in the N query statements, where the operators are used to indicate to-be-performed operations, the operands are used to indicate storage locations of data to be operated by the operators in the N query statements, the symbol identifiers include version numbers of the operands, operands indicating same data have a same version number, operands indicating different data have different version numbers, and the operators include at least a create operator, a destruct operator, a scan operator, and a filesink operator;

a relationship determining module, configured to determine dependency among the N query statements according to the version numbers that are of the operands in the N query statements and that are determined by the identifier determining module;

an optimization module, configured to perform inter-query optimization on the N query statements according to the dependency among the N query statements and a preset optimization rule; and a query module, configured to execute an optimized query statement to obtain query results of the N query statements.

With reference to the second aspect, in a first possible implementation manner of the second aspect, the identifier determining module is specifically configured to:

obtain N logical query plan trees corresponding to the N query statements, where one query statement is corresponding to one logical query plan tree;

add a symbol identifier to an operand of a first-type operator on the N logical query plan trees, where the first-type operator includes a create operator, a destruct operator, a scan operator, and a filesink operator; and perform the following operation on each of the N logical query plan trees:

adding a symbol identifier to an operand of a second-type operator on a first logical query plan tree according to a topology sequence of the first logical query plan tree, a symbol identifier of an operand of a first-type operator on the first logical query plan tree, and a preset adding rule, where the first logical query plan tree is any one of the N logical query plan trees, and the second-type operator is an operator other than the first-type operator.

With reference to the first possible implementation manner of the second aspect, in a second possible implementation manner of the second aspect, a root node of the first logical query plan tree includes a filesink operator, a leaf node of the first logical query plan tree includes a scan operator, an internal node of the first logical query plan tree includes a second-type operator, a create operator, or a destruct operator, and the internal node is a node other than the leaf node and the root node; and the adding rule includes:

performing the following operation on each second-type operator on the first logical query plan tree:

if an operand of a first operator is the same as an operand of a left child node of the first operator, adding, to the operand of the first operator, a symbol identifier that is the same as a symbol identifier of the operand of the left child node of the first operator, where the first operator is any one of second-type operators; or if an operand of a first operator is the same as an operand of a right child node of the first operator, adding, to the operand of the first operator, a symbol identifier that is the same as a symbol identifier of the operand of the right child node of the first operator.

With reference to any one of the second aspect, or the first to the second possible implementation manners of the second aspect, in a third possible implementation manner of the second aspect, the optimization rule includes at least one of the following rules:

deleting a query statement having a same operand version number and a same operator as a first query statement, where the first query statement is any one of the N query statements;

keeping a query sequence of query statements that have flow dependency, and optimizing multiple query statements that have flow dependency to a new query statement, where the flow dependency indicates that a version number of an operand of a filesink operator of a query statement executed is the same as a version number of an operand of another query statement executed subsequently; or combining query statements that have a same operator and overlapped operands.

With reference to the first possible implementation manner of the second aspect, in a fourth possible implementation manner of the second aspect, the symbol identifiers of the operands in the N query statements further include a hot data identifier; and the identifier determining module is further configured to:

collect statistics of a quantity of times that an operand of each scan operator on the N logical query plan trees is referenced;

determine whether the quantity of times that the operand of each scan operator on the N logical query plan trees is referenced is greater than a hot data threshold; and add a hot data identifier to an operand that is of a scan operator on the N logical query plan trees and that is referenced for a quantity of times greater than the hot data threshold, where the hot data identifier is used to indicate that data corresponding to an operand with the hot data identifier is hot data; and the query module is further configured to:

concurrently execute, in a process of executing the optimized query statement, optimized query statements that include the hot data identifier and that have no flow dependency or output dependency.

With reference to the first or the fourth possible implementation manner of the second aspect, in a fifth possible implementation manner of the second aspect, the symbol identifiers of the operands in the N query statements further include a start active location and an end active location; and the identifier determining module is further configured to:

determine a start active location of a first operand according to an identifier of a scan operator that references the first operand for the first time and a sequence number of a logical query plan tree on which the scan operator is located, where the first operand is any one of the operands in the N query statements; and determine an end active location of the first operand according to an identifier of a destruct operator used for destructing the first operand and a sequence number of a logical query plan tree on which the destruct operator is located; and the query module is further configured to:

release, according to the end active location of the first operand in the process of executing the optimized query statement, data storage space indicated by the first operand.

With reference to the fifth possible implementation manner of the second aspect, in a sixth possible implementation manner of the second aspect, the identifier determining module is further configured to:

determine a start active location of a second operand according to an identifier of a first filesink operator that references the second operand for the first time and a sequence number of a logical query plan tree on which the first filesink operator is located, where the first filesink operator is used for writing data to a storage location indicated by the second operand, and the second operand is any one of the operands in the N query statements; and determine an end active location of the second operand according to an identifier of a second filesink operator that references the second operand and a sequence number of a logical query plan tree on which the second filesink operator is located, where the second filesink operator is used for rewriting the data that is operated by the first filesink operator and that is corresponding to the second operand; and the query module is further configured to:

release, according to the end active location of the second operand in the process of executing the optimized query statement, data storage space indicated by the second operand.

According to the batch data query method and apparatus provided in the embodiments of the present invention, a data query server determines symbol identifiers of operands in N query statements according to operators and the operands in the N query statements, where the symbol identifiers include version numbers of the operands; determines dependency among the N query statements according to the version numbers of the operands in the N query statements; and then, performs inter-query optimization on the N query statements according to the dependency among the N query statements and a preset optimization rule. The symbol identifiers of the operands in the N query statements are fixed and do not vary with input query statements. Therefore, the embodiments provide a technology for statically analyzing and maintaining an inter-query data flow relationship, that is, a technology that is not related to input data and in which any part of any query statement does not need to be executed and data access and update statuses in a query statement execution process do not need to be monitored, so that inter-query optimization efficiency is improved, and inter-query optimization overheads are reduced.

BRIEF DESCRIPTION OF DRAWINGS

To describe technical solutions in embodiments of the present invention more clearly, the following briefly describes the accompanying drawings.

DESCRIPTION OF EMBODIMENTS

To make objectives, technical solutions, and advantages of embodiments of the present invention clearer, the following clearly describes technical solutions in embodiments of the present invention with reference to the accompanying drawings in the embodiments of the present invention. The described embodiments are some but not all of the embodiments of the present invention.

Methods in the embodiments of the present invention are mainly applied to a batch data query scenario. A client/server mode is usually used for batch data query. A database usually includes multiple data query servers, a storage system, and a large quantity of clients. The storage system may include one or more storage devices. In one batch query process, multiple clients may send query statements to a data query server. When determining that a quantity of received query statements reaches a preset quantity, the data query server performs batch query on multiple query statements, or the data query server performs batch query on all query statements received in a preset period of time. A common batch data query scenario is a data warehouse. The data warehouse is a structural data environment of data sources of a decision support system and an on-line analytical application. The data warehouse is mainly used for obtaining information from a database. Features of the data warehouse are subject-orientation, integration, stability, and time-variability. There are a large quantity of batch data query opportunities in the data warehouse. There is a large amount of data in the data warehouse, and the data is usually stored in a distributed storage system.

Figure 1:
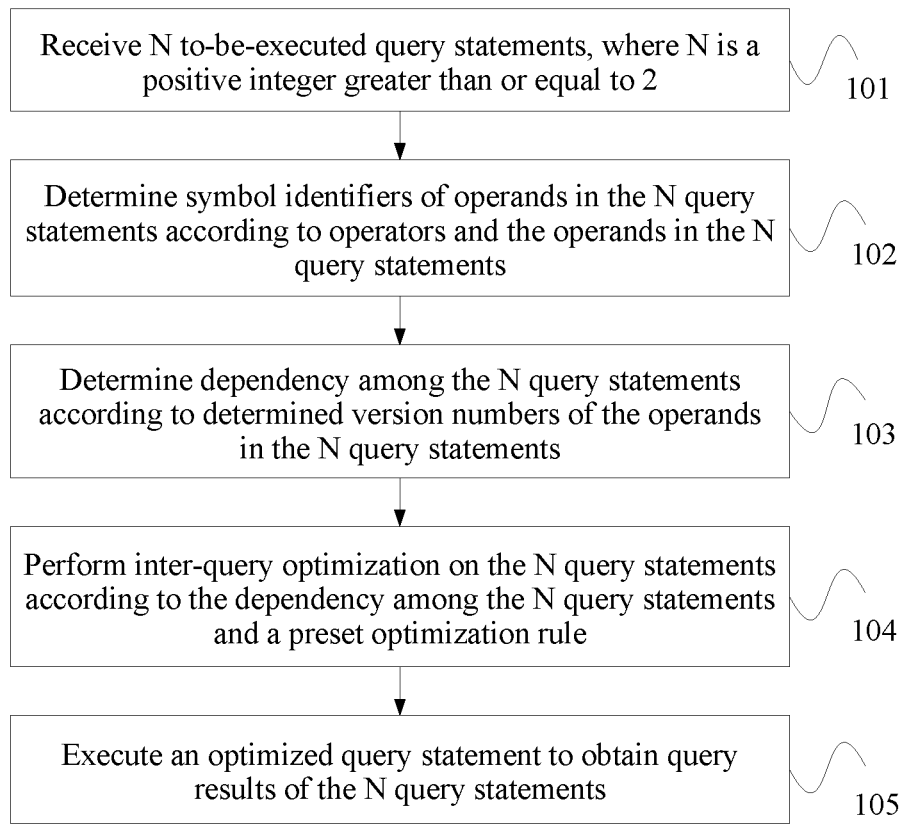
FIG. 1 is a flowchart of a batch data query method according to Embodiment 1 of the present invention.

FIG. 1 is a flowchart of a batch data query method according to Embodiment 1 of the present invention. The method provided in this embodiment may be performed by a data query server. As shown in FIG. 1, the method provided in this embodiment may include the following steps.

Step 101: Receive N to-be-executed query statements, where N is a positive integer greater than or equal to 2.

Step 102: Determine symbol identifiers of operands in the N query statements according to operators and the operands in the N query statements.

Each query statement includes multiple operators. Each operator references one or more operands, and the operator is used to indicate a to-be-performed operation. Common operators include a scan operator, a filesink operator, a create operator, a destruct operator, a sort operator, a select operator, an aggregate operator, a product operator, a join operator, and the like.

In this embodiment, an operand does not refer to a specific data record, but is used to indicate a storage location of data to be operated by an operator, that is, the operand is corresponding to the storage location. The operand may be a variable or an expression, the storage location indicated by the operand may be a data table, a partition in a data table, a field in a data table, or the like. In this embodiment, the symbol identifiers of the operands include version numbers of the operands. In addition, operands indicating same data have a same version number, and operands indicating different data have different version numbers. In a database, if two operators have operands with a same name (such as a), it does not necessarily mean that same data is operated by the two operators. Similarly, if two operators have operands with different names (such as a and b), it does not mean that different data is operated by the two operators. Therefore, when the symbol identifiers of the operands in the N query statements are determined, whether two operands are the same cannot be determined only according to names of the two operands, and whether the two operands are the same needs to be determined according to whether the two operands indicate same data. The data indicated by the operand is data stored in a storage location indicated by the operand.

When determining the symbol identifiers of the operands in the N query statements, the data query server may determine symbol identifiers of all operands in the N query statements according to a sequence of the N query statements and an execution sequence of operators in each query statement. In an implementation manner, the data query server first obtains N logical query plan trees corresponding to the N query statements. One query statement is corresponding to one logical query plan tree, and each node of each logical query plan tree is an operator. Then, the data query server adds a symbol identifier to an operand of a first-type operator on the N logical query plan trees. The first-type operator includes a create operator, a destruct operator, a scan operator, and a filesink operator. Before the symbol identifier is added to the operand of the first-type operator on the N logical query plan trees, the symbol identifier further needs to be generated for the operand of the first-type operator on the N logical query plan trees, where the generated symbol identifier includes a version number of the operand.

After the symbol identifier is added to the operand of the first-type operator on the N logical query plan trees, a symbol identifier further needs to be added to an operand of a second-type operator according to the symbol identifier of the operand of the first-type operator. Specifically, the following operation is performed on each of the N logical query plan trees:

A symbol identifier is added to an operand of a second-type operator on a first logical query plan tree according to a topology sequence of the first logical query plan tree, a symbol identifier of an operand of a first-type operator on the first logical query plan tree, and a preset adding rule. The first logical query plan tree is any one of the N logical query plan trees, and the second-type operator is an operator other than the first-type operator. In this embodiment, nodes of the first logical query plan tree include a root node, a leaf node, and an internal node. A node at the top (no parents) of the logical query plan tree is the root node, a node at the bottom (no child) of the logical query plan tree is the leaf node, and the internal node is a node having both parents and a child. The topology sequence of the first logical query plan tree refers to a sequence from the leaf node to the root node.

In this embodiment, the root node of the first logical query plan tree includes a filesink operator, the leaf node of the first logical query plan tree includes a scan operator, and the internal node of the first logical query plan tree includes a second-type operator, a create operator, and a destruct operator. The internal node is a node other than the leaf node and the root node. If the first logical query plan tree is a binary tree, the internal node of the first logical query plan tree has a left child node and a right child node. The foregoing adding rule includes: performing the following operation on each second-type operator on the first logical query plan tree: If an operand of a first operator is the same as an operand of a left child node of the first operator, a symbol identifier that is the same as a symbol identifier of the operand of the left child node of the first operator is added to the operand of the first operator; or if an operand of a first operator is the same as an operand of a right child node of the first operator, a symbol identifier that is the same as a symbol identifier of the operand of the right child node of the first operator is added to the operand of the first operator. The first operator is any one of second-type operators.

In this embodiment, the left child node and the right child node of the first operator may be first-type operators, or may be second-type operators. Specifically, when the left child node and the right child node of the first operator are leaf nodes, the left child node and the right child node of the first operator are first-type operators. When the left child node and the right child node of the first operator are internal nodes, the left child node and the right child node of the first operator are second-type operators. For example, it is assumed that the first logical query plan tree has four layers, a node included at the first layer is a root node, nodes included at the second layer and the third layer are internal nodes, and a node included at the fourth layer is a leaf node. When the symbol identifier is to be added to the operand of the second-type operator on the first logical query plan tree, a symbol identifier is first added to an operand of the internal node at the third layer according to an operand of the leaf node at the fourth layer, where the leaf node at the fourth layer is the first-type operator, and the internal node at the third layer is the second-type operator. That is, a symbol identifier is added to an operand of the second-type operator according to an operand of the first-type operator. After symbol identifiers are added to operands of all internal nodes at the third layer, symbol identifiers are added to operands of all internal nodes at the second layer according to the operands of all the internal nodes at the third layer. The internal nodes at the second layer are second-type operators. In this case, a symbol identifier may be added to an operand of the second-type operator at the second layer according to a symbol identifier of an operand of the second-type operator at the third layer.

Step 103: Determine dependency among the N query statements according to determined version numbers of the operands in the N query statements.

The dependency among the N statements may include flow dependency, output dependency, an operator overlapping relationship, and an operand overlapping relationship. The flow dependency indicates that a version number of an operand of a filesink operator of a query statement executed is the same as a version number of an operand of a scan operator of another query statement executed subsequently. The output dependency indicates that a value of a version number of an operand of a filesink operator of a query statement executed is defined by a filesink operator of another query statement executed subsequently, that is, the operand of the filesink operator executed is rewritten by the filesink operator executed subsequently. The operator overlapping relationship indicates that two query statements have same quantities of each type of operators, and the operand overlapping relationship indicates that all or some operands of two query statements have a same version number.

Step 104: Perform inter-query optimization on the N query statements according to the dependency among the N query statements and a preset optimization rule.

Inter-query optimization is overall optimization performed on multiple logical query plan trees, that is, there is an optimization opportunity among the logical query plan trees, and optimization is not performed on a single logical query plan tree. The optimization rule includes at least one of the following rules: (1) A query statement having a same operand version number and a same operator as a first query statement is deleted, where the first query statement is any one of the N query statements. (2) A query sequence of query statements that have flow dependency is kept, and multiple query statements that have flow dependency are optimized to a new query statement. (3) Query statements that have a same operator and overlapped operands are combined.

The optimization rule (1) is for inter-query optimization of query statements in an operator overlapping relationship. The query statement having the same operand version number and the same operator as the first query statement is referred to as a second query statement. Because the first query statement has the same operand version number and the same operator as the second query statement, query results of the first query statement and the second query statement are the same, and the second query statement may be deleted. If both the first query statement and the second query statement are parsed to logical query plan subtrees, a first logical query plan tree corresponding to the first query statement and a second logical query plan tree corresponding to the second query statement have a common query subtree, that is, a first query subtree of the first logical query plan tree and a second query subtree of the second logical query plan tree are in a same tree structure, and a data identifier of an operand of each operator on the first query subtree is the same as a version number of an operand of each operator on the second query subtree. Optimization is performed by using an optimization opportunity of the common query subtree, so that repeated query on a same query result is avoided, database query overheads are reduced, and database query efficiency is improved.

The optimization rule (2) is for inter-query optimization of query statements with flow dependency. A predecessor of a filesink operator executed may be directly connected to a successor of a scan operator executed subsequently, and the scan operator executed subsequently may be deleted. In this way, after the filesink operator is executed, an output result of the filesink operator is directly processed as input of the scan operator without first writing the output result of the filesink operator into a distributed storage system and then reading the output result of the filesink operator. Therefore, read/write overheads of the distributed storage system are reduced, and query efficiency is improved.

The optimization rule (3) is for inter-query optimization of query statements in an operand overlapping relationship. If a first operator of a first query statement is the same as a second operator of a second query statement, and version numbers of some operands of the first operator are the same as version numbers of some operands of the second operator, in a subsequent query process, when physical query trees are generated for the first query statement and the second query statement, the first operator and the second operator are combined into a same task, and overlapped operands and non-overlapped operands are separately queried. Because the first operator and the second operator are combined into the same task, the overlapped operands are queried only once, so that scan operation overheads for overlapped data are reduced.

Step 105: Execute an optimized query statement to obtain query results of the N query statements.

In this embodiment, a data query server determines symbol identifiers of operands in N query statements according to operators and the operands in the N query statements, where the symbol identifiers include version numbers of the operands; determines dependency among the N query statements according to the version numbers of the operands in the N query statements; and then, performs inter-query optimization on the N query statements according to the dependency among the N query statements and a preset optimization rule. The symbol identifiers of the operands in the N query statements are fixed and do not vary with input query statements. Therefore, this embodiment provides a technology for statically analyzing and maintaining an inter-query data flow relationship, that is, a technology that is not related to input data and in which any part of any query statement does not need to be executed and data access and update statuses in a query statement execution process do not need to be monitored, so that inter-query optimization efficiency is improved, and inter-query optimization overheads are reduced.

Based on Embodiment 1, optionally, the symbol identifiers of the operands in the N query statements may further include a hot data identifier, and the determining symbol identifiers of operands in the N query statements according to operators and the operands in the N query statements further includes: collecting statistics of a quantity of times that an operand of each scan operator on the N logical query plan trees is referenced; determining whether the quantity of times that the operand of each scan operator on the N logical query plan trees is referenced is greater than a hot data threshold; and adding a hot data identifier to an operand that is of a scan operator on the N logical query plan trees and that is referenced for a quantity of times greater than the hot data threshold, where the hot data identifier is used to indicate that data corresponding to an operand with the hot data identifier is hot data. Correspondingly, in a subsequent process of executing the optimized query statement, optimized query statements that include the hot data identifier and that have no flow dependency or output dependency may be concurrently executed. Alternatively, operators corresponding to operands that include hot data identifiers are re-sorted without changing inter-query flow dependency and output dependency, so that the operators are executed consecutively, to improve hot data access efficiency.

Optionally, the symbol identifiers of the operands in the N query statements may further include a start active location and an end active location, and the determining symbol identifiers of operands in the N query statements according to operators and the operands in the N query statements further includes: determining a start active location of a first operand according to an identifier of a scan operator that references the first operand for the first time and a sequence number of a logical query plan tree on which the scan operator is located, where the first operand is any one of the operands in the N query statements; and determining an end active location of the first operand according to an identifier of a destruct operator used for destructing the first operand and a sequence number of a logical query plan tree on which the destruct operator is located. Correspondingly, in the subsequent process of executing the optimized query statement, data storage space indicated by the first operand may be released according to the end active location of the first operand. Specifically, the data query server may determine, according to the end active location of the first operand, that the first operand is inactive after the end active location. Storage space occupied by an inactive operand needs to be released as soon as possible, so as to be occupied by another operand. Therefore, storage space utilization can be improved. Alternatively, the data query server may determine an active interval of the first operand according to the start active location and the end active location of the first operand. For an operand with a relatively short active interval (for example, the operand is active only in a specific query), if the operand is stored in a distributed storage system, a storage location of the operand may be changed from the distributed storage system to a local disk or a memory of the data query server by means of optimization, to reduce writing overheads and access overheads.

In addition, any one of the operands in the N query statements may be referred to as a second operand in this embodiment of the present invention. A start active location of a second operand is determined according to an identifier of a first filesink operator that references the second operand for the first time and a sequence number of a logical query plan tree on which the first filesink operator is located. The first filesink operator is used for writing data to a storage location indicated by the second operand. An end active location of the second operand is determined according to an identifier of a second filesink operator that references the second operand and a sequence number of a logical query plan tree on which the second filesink operator is located. The second filesink operator is used for rewriting the data that is operated by the first filesink operator and that is corresponding to the second operand. Correspondingly, in the subsequent process of executing the optimized query statement, data storage space indicated by the second operand is released according to the end active location of the second operand. It should be noted that an identifier of each operator mentioned in this embodiment is used to identify a sequence of the operator, and may be specifically an identity (ID) of the operator.

Figure 2:
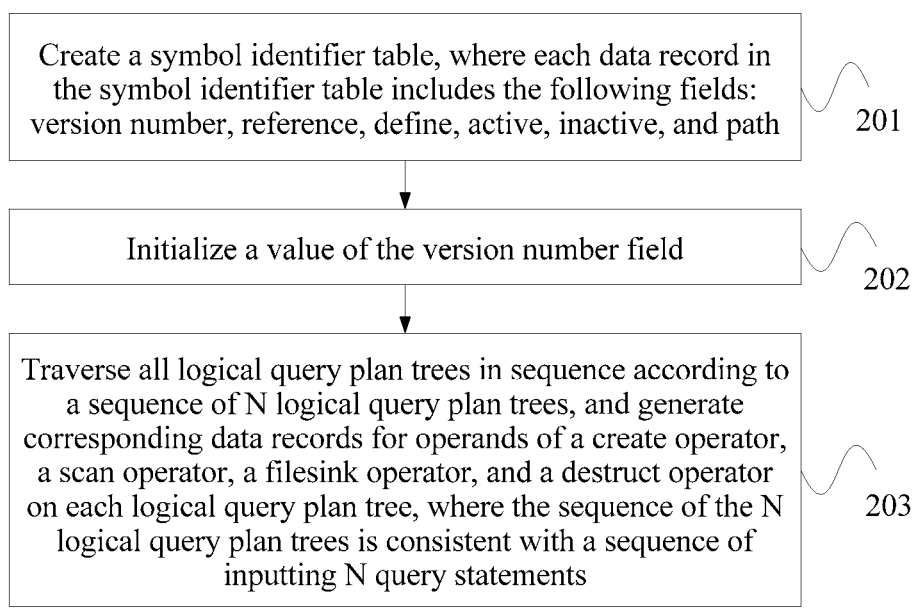
FIG. 2 is a flowchart of determining symbol identifiers of operands in N query statements according to Embodiment 2 of the present invention.

Based on the foregoing Embodiment 1, Embodiment 2 of the present invention describes, by using a specific example, how to determine symbol identifiers of operands in N query statements. FIG. 2 is a flowchart of determining symbol identifiers of operands in N query statements according to Embodiment 2 of the present invention. As shown in FIG. 2, a method provided in this embodiment may include the following steps.

Step 201: Create a symbol identifier table, where each data record in the symbol identifier table includes the following fields: version number, reference, define, active, inactive, and path.

In this embodiment, the symbol identifier table is first created, and the symbol identifier table is used for maintaining symbol identifiers of operands in N query statements. A table structure is not a unique form for storing the symbol identifiers. The symbol identifiers may be stored in a storage form of a linked list, a hash table, or the like.

Each data record in the symbol identifier table includes the following fields: version number, reference, define, active, inactive, and path. The version number field is used to store a version number of an operand corresponding to the data record. The reference field is used to store an identifier of a scan operator that references the operand corresponding to the data record and a sequence number of a logical query plan tree on which the scan operator is located. The define field is used to store an identifier of a filesink operator that defines the operand corresponding to the data record and a sequence number of a logical query plan tree on which the filesink operator is located. The path field is used to store a storage location of the operand corresponding to the data record. The active field is used to store the identifier of the scan operator that references the operand corresponding to the data record and the sequence number of the logical query plan tree on which the scan operator is located, or is used to store the identifier of the filesink operator that defines the operand corresponding to the data record and the sequence number of the logical query plan tree on which the filesink operator is located. The inactive field is used to store an identifier of a destruct operator used for destructing the operand corresponding to the data record and a sequence number of a logical query plan tree on which the destruct operator is located, or is used to store an identifier of a filesink operator that deregisters the operand corresponding to the data record and a sequence number of a logical query plan tree on which the filesink operator is located.

Step 202: Initialize a value of the version number field.

For example, the value of the version number field is initialized to −1. Then, each time a data record is added to the symbol identifier table, 1 is added to the value of the version number field.

Step 203: Traverse all logical query plan trees in sequence according to a sequence of N logical query plan trees, and generate corresponding data records for operands of a create operator, a scan operator, a filesink operator, and a destruct operator on each logical query plan tree, where the sequence of the N logical query plan trees is consistent with a sequence of inputting N query statements.

Specifically, the corresponding data records may be generated for the operands of the create operator, the scan operator, the filesink operator, and the destruct operator on each logical query plan tree in the following two manners. A first manner is as follows.

When an $i^{th}$ logical query plan tree is being traversed, if the $i^{th}$ logical query plan tree includes a create operator, a data record is created for an operand of the create operator on the $i^{th}$ logical query plan tree, and a correspondence between a version number of the operand of the create operator on the $i^{th}$ logical query plan tree and a storage location of the operand of the create operator on the $i^{th}$ logical query plan tree is saved in a mapping relationship table. In this embodiment, the mapping relationship table is used to store a correspondence between a version number of an operand and a storage location of the operand, i is a number of the N logical query plan trees, an initial value of i is 1, and a value of i is an integer that is greater than or equal to 1 and less than or equal to N. Creating the data record for the operand of the create operator on the $i^{th}$ logical query plan tree is specifically: 1 is added to a current value of the version number field in the symbol identifier table to obtain the version number of the operand of the create operator on the $i^{th}$ logical query plan tree, the version number of the operand of the create operator on the $i^{th}$ logical query plan tree is added to a version number field of the data record corresponding to the operand of the create operator on the $i^{th}$ logical query plan tree, and other fields of the data record corresponding to the operand of the create operator on the $i^{th}$ logical query plan tree are null.

If the $i^{th}$ logical query plan tree includes a destruct operator, the mapping relationship table is searched, according to a storage location of an operand of the destruct operator on the $i^{th}$ logical query plan tree, for a version number corresponding to the storage location of the operand of the destruct operator on the $i^{th}$ logical query plan tree. If the version number corresponding to the storage location of the operand of the destruct operator on the $i^{th}$ logical query plan tree is found, the symbol identifier table is searched, according to the version number corresponding to the storage location of the operand of the destruction operator on the $i^{th}$ logical query plan tree, for a data record corresponding to the operand of the destruct operator on the $i^{th}$ logical query plan tree, and the sequence number i of the $i^{th}$ logical query plan tree and an identifier of the destruct operator on the $i^{th}$ logical query plan tree are added to an inactive field of the data record corresponding to the operand of the destruct operator on the $i^{th}$ logical query plan tree.

If the $i^{th}$ logical query plan tree includes a scan operator, the mapping relationship table is searched, according to a storage location of an operand of the scan operator on the $i^{th}$ logical query plan tree, for a version number corresponding to the storage location of the operand of the scan operator on the $i^{th}$ logical query plan tree.

If the version number corresponding to the storage location of the operand of the scan operator on the $i^{th}$ logical query plan tree is found, the symbol identifier table is searched, according to the version number corresponding to the storage location of the operand of the scan operator on the $i^{th}$ logical query plan tree, for a data record corresponding to the operand of the scan operator on the $i^{th}$ logical query plan tree. After the data record corresponding to the operand of the scan operator on the $i^{th}$ logical query plan tree is found, it is determined whether an active field of the data record corresponding to the operand of the scan operator on the $i^{th}$ logical query plan tree is null. If a value of the active field of the data record corresponding to the operand of the scan operator on the $i^{th}$ logical query plan tree is null, the sequence number i of the $i^{th}$ logical query plan tree and an identifier of the scan operator on the $i^{th}$ logical query plan tree are added to a reference field and the active field of the data record corresponding to the operand of the scan operator on the $i^{th}$ logical query plan tree. If the active field of the data record corresponding to the operand of the scan operator on the $i^{th}$ logical query plan tree is not null, the sequence number i of the $i^{th}$ logical query plan tree and an identifier of the scan operator on the $i^{th}$ logical query plan tree are added to a reference field of the data record corresponding to the operand of the scan operator on the $i^{th}$ logical query plan tree. If the version number corresponding to the storage location of the operand of the scan operator on the $i^{th}$ logical query plan tree is not found, a data record is created for the operand of the scan operator on the $i^{th}$ logical query plan tree, a correspondence between a version number of the operand of the scan operator on the $i^{th}$ logical query plan tree and the storage location of the operand of the scan operator on the $i^{th}$ logical query plan tree is saved in the mapping relationship table, and the sequence number i of the $i^{th}$ logical query plan tree and the identifier of the scan operator on the $i^{th}$ logical query plan tree are added to a reference field and an active field of the newly-created data record.

In this embodiment, if the version number corresponding to the storage location of the operand of the scan operator on the $i^{th}$ logical query plan tree is found in the mapping relationship table, it indicates that operands of scan operators on previous i−1 logical query plan trees are the same as the operand of the scan operator on the $i^{th}$ logical query plan tree. Therefore, a version number has been generated for the same operand. If the version number corresponding to the storage location of the operand of the scan operator on the $i^{th}$ logical query plan tree is not found in the mapping relationship table, it indicates that the operand of the scan operator on the $i^{th}$ logical query plan tree appears for the first time, and no version number is generated for the operand of the scan operator on the $i^{th}$ logical query plan tree.

If the $i^{th}$ logical query plan tree includes a filesink operator, the mapping relationship table is searched, according to a storage location of an operand of the filesink operator on the $i^{th}$ logical query plan tree, for a version number corresponding to the storage location of the operand of the filesink operator on the $i^{th}$ logical query plan tree. If the version number corresponding to the storage location of the operand of the filesink operator on the $i^{th}$ logical query plan tree is found, the symbol identifier table is searched, according to the version number corresponding to the storage location of the operand of the filesink operator on the $i^{th}$ logical query plan tree, for a data record corresponding to the operand of the filesink operator on the $i^{th}$ logical query plan tree. After the data record corresponding to the operand of the filesink operator on the $i^{th}$ logical query plan tree is found, it is determined whether a value of a define field of the data record corresponding to the operand of the filesink operator on the $i^{th}$ logical query plan tree is null.

If the define field of the data record corresponding to the operand of the filesink operator on the $i^{th}$ logical query plan tree is null, the sequence number i of the $i^{th}$ logical query plan tree and an identifier of the filesink operator on the $i^{th}$ logical query plan tree are first added to an inactive field of the data record corresponding to the operand of the filesink operator on the $i^{th}$ logical query plan tree. Then, a data record is created for the operand of the filesink operator on the $i^{th}$ logical query plan tree, a correspondence between a version number of the operand of the filesink operator on the $i^{th}$ logical query plan tree and the storage location of the operand of the filesink operator on the $i^{th}$ logical query plan tree is saved in the mapping relationship table, and the sequence number i of the $i^{th}$ logical query plan tree and the identifier of the filesink operator on the $i^{th}$ logical query plan tree are added to a define field and an active field of the newly-created data record.

In the first manner, when each logical query plan tree is traversed, version numbers are generated for operands on each logical query plan tree in the following sequence: a create operator, a destruct operator, a scan operator, and a filesink operator. In another possible implementation manner of the present invention, the version numbers may not be generated for the operands on each logical query plan tree according to the foregoing operator sequence. It should be noted that, if the version numbers are generated for the operands on each logical query plan tree according to another sequence, each time a data record is created, the mapping relationship table needs to be first queried. If a version number corresponding to an operand of a current operator is not found in the mapping relationship table, a new data record is generated for the operand of the current operator.

In the first manner, the version numbers of the operands of the N logical query plan trees are generated by means of only one time of traversal. In a second manner, the version numbers of the operands of the N logical query plan trees need to be generated by means of multiple times of traversal. A version number is generated for an operand of only a particular operator in each time of traversal. In the second manner, the symbol identifier table also needs to be created first, and fields in the symbol identifier table are also the same as those in the first manner. Differently, in this manner, the mapping relationship table is used to store a correspondence between a storage location of an operand and a 2-tuple, where the 2-tuple includes a version number of the operand and a sequence number of a logical query plan tree on which the operand is located. The second manner is as follows.

First, the N logical query plan trees are traversed once according to the sequence of the N logical query plan trees, and data records are created for operands of all filesink operator on the N logical query plan trees in sequence. When the data record is created for the operand of each filesink operator, a value obtained after 1 is added to a current value of a version number field in the symbol identifier table is used as a version number of an operand of a current filesink operator, the version number of the operand of the current filesink operator is added to a version number field of a current data record, and an identifier of the current filesink operator and a sequence number of a logical query plan tree on which the current filesink operator is located are added to a define field and an active field of the current data record. Then, a correspondence between a storage location of the operand of the current filesink operator and a 2-tuple is saved in the mapping relationship table, where the 2-tuple includes the version number of the operand of the current filesink operator and the sequence number of the logical query plan tree on which the current filesink operator is located.

Then, the N logical query plan trees are traversed for the second time according to the sequence of the N logical query plan trees, and destruct operators on the N logical query plan trees are processed in sequence as follows: (1) The mapping relationship table is searched according to a storage location of an operand of a current destruct operator, to obtain a set of all 2-tuples that include a version number of an operand and a sequence number of a logical query plan tree and that are corresponding to the storage location of the operand of the current destruct operator. (2) All candidate logical query plan trees whose sequence numbers are smaller than a sequence number of a logical query plan tree on which the current destruct operator is located are selected from the set of 2-tuples, a logical query plan tree with a maximum sequence number is determined from the candidate logical query plan trees, and a 2-tuple in which the maximum sequence number exists is found in the set of 2-tuples, to obtain a version number in the 2-tuple in which the maximum sequence number exists. (3) The symbol identifier table is searched, according to the version number in the 2-tuple in which the maximum sequence number exists, for a data record corresponding to the version number in the 2-tuple in which the maximum sequence number exists, and an identifier of the current destruct operator and the sequence number of the logical query plan tree on which the current destruct operator is located are added to an inactive field of the data record corresponding to the version number in the 2-tuple in which the maximum sequence number exists. If the version number in the 2-tuple in which the maximum sequence number is located is not found, a next destruct operator is skipped to, and the foregoing processing is performed.

Then, the N logical query plan trees are traversed for the third time according to the sequence of the N logical query plan trees, and all scan operators on the N logical query plan trees are processed as follows: (1) The mapping relationship table is searched according to a storage location of an operand of a current scan operator, to obtain a set of all 2-tuples that include a version number of an operand and a sequence number of a logical query plan tree and that are corresponding to the storage location of the operand of the current scan operator. (2) All candidate logical query plan trees whose sequence numbers are greater than or equal to a sequence number of a logical query plan tree on which the current scan operator is located are selected from the set of 2-tuples, a logical query plan tree with a minimum sequence number is determined from the candidate logical query plan trees, and a 2-tuple in which the minimum sequence number exists is found in the set of 2-tuples, to obtain a version number in the 2-tuple in which the minimum sequence number exists. (3) The symbol identifier table is searched, according to the version number in the 2-tuple in which the minimum sequence number exists, for a data record corresponding to the version number in the 2-tuple in which the minimum sequence number exists, and an identifier of the current scan operator and the sequence number of the logical query plan tree on which the current scan operator is located are added to a reference field of the data record corresponding to the version number in the 2-tuple in which the minimum sequence number exists. (4) If an active field of the data record corresponding to the version number in the 2-tuple in which the minimum sequence number exists is null, the identifier of the current scan operator and the sequence number of the logical query plan tree on which the current scan operator is located are added to the active field of the data record corresponding to the version number in the 2-tuple in which the minimum sequence number exists. If the version number in the 2-tuple in which the minimum sequence number exists is not found, a data record is newly created in the symbol identifier table, 1 is added to a maximum value of a version number field to obtain a version number of the operand of the current scan operator, the version number of the operand of the current scan operator is added to a version number field of the newly-created data record, the storage location of the operand of the current scan operator is added to a path field of the newly-created data record, and the identifier of the current scan operator and the sequence number of the logical query plan tree on which the current scan operator is located are added to a reference field and an active field of the newly-created data record.

Finally, the N logical query plan trees are traversed for the fourth time according to a reversed sequence of the N logical query plan trees, and all create operators on the N logical query plan trees are processed in sequence as follows: (1) The mapping relationship table is searched according to a storage location of an operand of a current create operator, to obtain a set of all 2-tuples that include a version number of an operand and a sequence number of a logical query plan tree and that are corresponding to the storage location of the operand of the current create operator. (2) All candidate logical query plan trees whose sequence numbers are greater than or equal to a sequence number of a logical query plan tree on which the current create operator is located are selected from the set of 2-tuples, a logical query plan tree with a minimum sequence number is determined from the candidate logical query plan trees, and a 2-tuple in which the minimum sequence number exists is found from the set of 2-tuples, to obtain a version number of the 2-tuple in which the minimum sequence number exists. (3) The symbol identifier table is searched, according to the version number in the 2-tuple in which the minimum sequence number exists, for a data record corresponding to the version number in the 2-tuple in which the minimum sequence number exists, and it is determined whether a path field of the data record corresponding to the version number in the 2-tuple in which the minimum sequence number exists is null. If the path field of the data record corresponding to the version number in the 2-tuple in which the minimum sequence number exists is null, the storage location of the operand of the current create operator is added to the path field of the data record corresponding to the version number in the 2-tuple in which the minimum sequence number exists. If the path field of the data record corresponding to the version number in the 2-tuple in which the minimum sequence number exists is not null, a next create operator is skipped to, and the foregoing method is performed.

In the second manner, when each logical query plan tree is traversed, version numbers are generated for operands of each logical query plan tree in the following sequence: a destruct operator, a scan operator, a filesink operator, and a create operator. In the second manner, when the N logical query plan trees are traversed for the fourth time, the N logical query plan trees are traversed according to the reversed sequence of the N logical query plan trees. If the N logical query plan trees are traversed according to the sequence of the N logical query plan trees, when a version number is generated for a scan operator, a new data record is generated for an operand of the current scan operator if a version number that meets a condition is not found in the mapping relationship table. In this embodiment, version numbers are generated for operands of all operators on each logical query plan tree, and the generated version numbers are added to the logical query plan tree, so that the N logical query plan trees are optimized according to the version numbers of the operands in a subsequent query optimization process.

Based on Embodiment 2, when a data query apparatus collects statistics of a quantity of times that an operand of each scan operator on N logical query plan trees is referenced, statistics of start active locations and end active locations of all operands in a symbol identifier table may be collected according to values of an active field and an inactive field of each data record in the symbol identifier table. Specifically, it is first determined whether values of an active field and an inactive field of a current data record are null. If the values of the active field and the inactive field of the current data record are null, it indicates that an operand corresponding to the current data record is inactive in an entire batch query process, and the current data record may be deleted from the symbol identifier table. If the values of the active field and the inactive field of the current data record are not null, a start active location of the operand corresponding to the current data record is determined according to an identifier of an operator in the active field of the current data record and a sequence number of a logical query plan tree to which the operator belongs, and an end active location of the operand corresponding to the current data record is determined according to an identifier of an operator in the inactive field of the current data record and a sequence number of a logical query plan tree to which the operator belongs. There is only one operator in the active field of the current data record, and the operator may be a scan operator or a filesink operator. There is also only one operator in the inactive field of the current data record, and the operator may be a destruct operator or a filesink operator.

Figure 3:
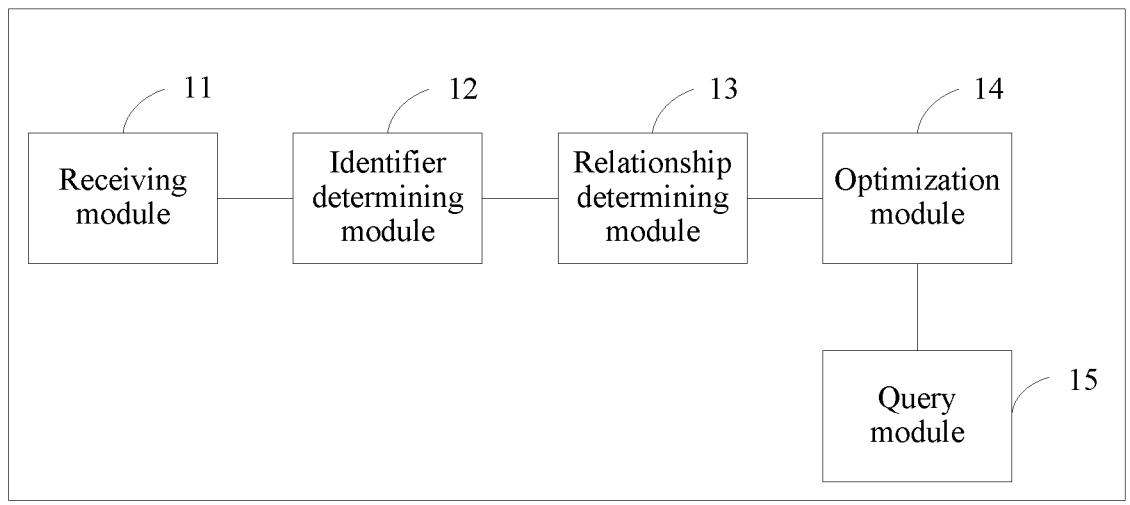
FIG. 3 is a schematic structural diagram of a data query server according to Embodiment 3 of the present invention.

FIG. 3 is a schematic structural diagram of a data query server according to Embodiment 3 of the present invention. As shown in FIG. 3, the data query server provided in this embodiment includes a receiving module 11, an identifier determining module 12, a relationship determining module 13, an optimization module 14, and a query module 15.

The receiving module 11 is configured to receive N to-be-executed query statements, where N is a positive integer that is not less than 2.

The identifier determining module 12 is configured to determine symbol identifiers of operands in the N query statements according to operators and the operands in the N query statements. The operators are used to indicate to-be-performed operations, the operands are used to indicate storage locations of data to be operated by the operators in the N query statements, the symbol identifiers include version numbers of the operands, operands indicating a same data have same version number, operands indicating different data have different version numbers, and the operators include at least a create operator, a destruct operator, a scan operator, and a filesink operator.

The relationship determining module 13 is configured to determine dependency among the N query statements according to the version numbers that are of the operands in the N query statements and that are determined by the identifier determining module 12.

The optimization module 14 is configured to perform inter-query optimization on the N query statements according to the dependency among the N query statements and a preset optimization rule.

The query module 15 is configured to execute an optimized query statement to obtain query results of the N query statements.

Optionally, the identifier determining module 12 is specifically configured to: obtain N logical query plan trees corresponding to the N query statements, where one query statement is corresponding to one logical query plan tree; add a symbol identifier to an operand of a first-type operator on the N logical query plan trees, where the first-type operator includes a create operator, a destruct operator, a scan operator, and a filesink operator; and perform the following operation on each of the N logical query plan trees: adding a symbol identifier to an operand of a second-type operator on a first logical query plan tree according to a topology sequence of the first logical query plan tree, a symbol identifier of an operand of a first-type operator on the first logical query plan tree, and a preset adding rule, where the first logical query plan tree is any one of the N logical query plan trees, and the second-type operator is an operator other than the first-type operator.

In this embodiment, a root node of the first logical query plan tree includes a filesink operator, a leaf node of the first logical query plan tree includes a scan operator, and an internal node of the first logical query plan tree includes a second-type operator, a create operator, or a destruct operator. The internal node is a node other than the leaf node and the root node. The adding rule includes: performing the following operation on each second-type operator on the first logical query plan tree:

if an operand of a first operator is the same as an operand of a left child node of the first operator, adding, to the operand of the first operator, a symbol identifier that is the same as a symbol identifier of the operand of the left child node of the first operator, where the first operator is any one of second-type operators; or if an operand of a first operator is the same as an operand of a right child node of the first operator, adding, to the operand of the first operator, a symbol identifier that is the same as a symbol identifier of the operand of the right child node of the first operator.

Optionally, the optimization rule includes at least one of the following rules: deleting a query statement having a same operand version number and a same operator as a first query statement, where the first query statement is any one of the N query statements; keeping a query sequence of query statements that have flow dependency, and optimizing multiple query statements that have flow dependency to a new query statement, where the flow dependency indicates that a version number of an operand of a filesink operator of a query statement executed is the same as a version number of an operand of another query statement executed subsequently; or combining query statements that have a same operator and overlapped operands.

Optionally, the symbol identifiers of the operands in the N query statements further include a hot data identifier. The identifier determining module 12 is further configured to: collect statistics of a quantity of times that an operand of each scan operator on the N logical query plan trees is referenced; determine whether the quantity of times that the operand of each scan operator on the N logical query plan trees is referenced is greater than a hot data threshold; and add a hot data identifier to an operand that is of a scan operator on the N logical query plan trees and that is referenced for a quantity of times greater than the hot data threshold, where the hot data identifier is used to indicate that data corresponding to an operand with the hot data identifier is hot data. Correspondingly, the query module 15 is further configured to concurrently execute, in a process of executing the optimized query statement, optimized query statements that include the hot data identifier and that have no flow dependency or output dependency.

Optionally, the symbol identifiers of the operands in the N query statements further include a start active location and an end active location. The identifier determining module 12 is further configured to: determine a start active location of a first operand according to an identifier of a scan operator that references the first operand for the first time and a sequence number of a logical query plan tree on which the scan operator is located, where the first operand is any one of the operands in the N query statements; and determine an end active location of the first operand according to an identifier of a destruct operator used for destructing the first operand and a sequence number of a logical query plan tree on which the destruct operator is located. Correspondingly, the query module 15 is further configured to release, according to the end active location of the first operand in the process of executing the optimized query statement, data storage space indicated by the first operand.

Optionally, the identifier determining module 12 is further configured to: determine a start active location of a second operand according to an identifier of a first filesink operator that references the second operand for the first time and a sequence number of a logical query plan tree on which the first filesink operator is located, where the first filesink operator is used for writing data to a storage location indicated by the second operand, and the second operand is any one of the operands in the N query statements; and determine an end active location of the second operand according to an identifier of a second filesink operator that references the second operand and a sequence number of a logical query plan tree on which the second filesink operator is located, where the second filesink operator is used for rewriting the data that is operated by the first filesink operator and that is corresponding to the second operand. The query module 15 is further configured to release, according to the end active location of the second operand in the process of executing the optimized query statement, data storage space indicated by the second operand.

The data query server provided in this embodiment may be configured to perform the methods in Embodiment 1 and Embodiment 2. Specific implementation manners and technical effects thereof are similar to those of the methods, and details are not described herein.

Figure 4:
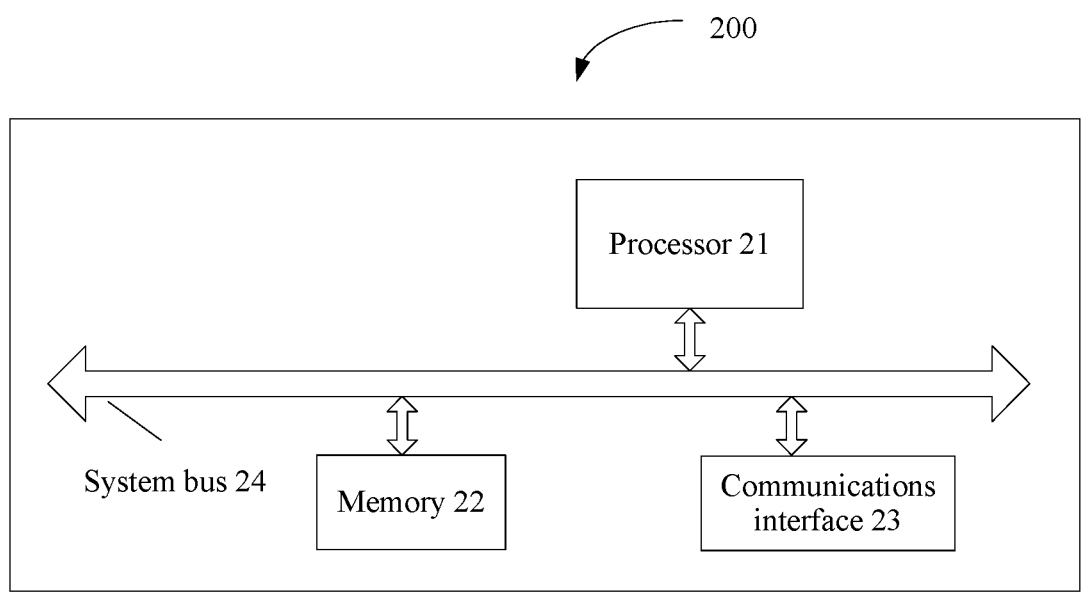
FIG. 4 is a schematic structural diagram of a data query server according to Embodiment 4 of the present invention.

FIG. 4 is a schematic structural diagram of a data query server according to Embodiment 4 of the present invention. As shown in FIG. 4, a data query server 200 provided in this embodiment includes a processor 21, a memory 22, a communications interface 23, and a system bus 24. The memory 22 and the communications interface 23 are connected to and communicate with the processor 21 by using the system bus 24. The memory 22 is configured to store a computer execution instruction. The communications interface 23 is configured to communicate with another device. The processor 21 is configured to run the computer execution instruction and perform the following method:

receiving N to-be-executed query statements, where N is a positive integer that is not less than 2;

determining symbol identifiers of operands in the N query statements according to operators and the operands in the N query statements, where the operators are used to indicate to-be-performed operations, the operands are used to indicate storage locations of data to be operated by the operators in the N query statements, the symbol identifiers include version numbers of the operands, operands indicating same data have a same version number, operands indicating different data have different version numbers, and the operators include at least a create operator, a destruct operator, a scan operator, and a filesink operator;

determining dependency among the N query statements according to the determined version numbers of the operands in the N query statements;

performing inter-query optimization on the N query statements according to the dependency among the N query statements and a preset optimization rule; and executing an optimized query statement to obtain query results of the N query statements.

Optionally, that the processor 21 is specifically configured to:

obtain N logical query plan trees corresponding to the N query statements, where one query statement is corresponding to one logical query plan tree;

add a symbol identifier to an operand of a first-type operator on the N logical query plan trees, where the first-type operator includes a create operator, a destruct operator, a scan operator, and a filesink operator; and perform the following operation on each of the N logical query plan trees;

add a symbol identifier to an operand of a second-type operator on a first logical query plan tree according to a topology sequence of the first logical query plan tree, a symbol identifier of an operand of a first-type operator on the first logical query plan tree, and a preset adding rule, where the first logical query plan tree is any one of the N logical query plan trees, and the second-type operator is an operator other than the first-type operator.

In this embodiment, a root node of the first logical query plan tree includes a filesink operator, a leaf node of the first logical query plan tree includes a scan operator, and an internal node of the first logical query plan tree includes a second-type operator, a create operator, or a destruct operator. The internal node is a node other than the leaf node and the root node. The adding rule includes: performing the following operation on each second-type operator on the first logical query plan tree:

if an operand of a first operator is the same as an operand of a left child node of the first operator, adding, to the operand of the first operator, a symbol identifier that is the same as a symbol identifier of the operand of the left child node of the first operator, where the first operator is any one of second-type operators; or if an operand of a first operator is the same as an operand of a right child node of the first operator, adding, to the operand of the first operator, a symbol identifier that is the same as a symbol identifier of the operand of the right child node of the first operator.

Optionally, the optimization rule includes at least one of the following rules: deleting a query statement having a same operand version number and a same operator as a first query statement, where the first query statement is any one of the N query statements; keeping a query sequence of query statements that have flow dependency, and optimizing multiple query statements that have flow dependency to a new query statement, where the flow dependency indicates that a version number of an operand of a filesink operator of a query statement executed is the same as a version number of an operand of another query statement executed subsequently; or combining query statements that have a same operator and overlapped operands.

Optionally, the symbol identifiers of the operands in the N query statements further include a hot data identifier. The processor 21 is further configured to: collect statistics of a quantity of times that an operand of each scan operator on the N logical query plan trees is referenced; determine whether the quantity of times that the operand of each scan operator on the N logical query plan trees is referenced is greater than a hot data threshold; and add a hot data identifier to an operand that is of a scan operator on the N logical query plan trees and that is referenced for a quantity of times greater than the hot data threshold, where the hot data identifier is used to indicate that data corresponding to an operand with the hot data identifier is hot data. In a subsequent process of executing the optimized query statement, optimized query statements that include the hot data identifier and that have no flow dependency or output dependency are concurrently executed.

Optionally, the symbol identifiers of the operands in the N query statements further include a start active location and an end active location. The processor 21 is further configured to: determine a start active location of a first operand according to an identifier of a scan operator that references the first operand for the first time and a sequence number of a logical query plan tree on which the scan operator is located, where the first operand is any one of the operands in the N query statements; and determine an end active location of the first operand according to an identifier of a destruct operator used for destructing the first operand and a sequence number of a logical query plan tree on which the destruct operator is located. In the subsequent process of executing the optimized query statement, data storage space indicated by the first operand is released according to the end active location of the first operand.

The processor 21 is further configured to: determine a start active location of a second operand according to an identifier of a first filesink operator that references the second operand for the first time and a sequence number of a logical query plan tree on which the first filesink operator is located, where the first filesink operator is used for writing data to a storage location indicated by the second operand, and the second operand is any one of the operands in the N query statements; and determine an end active location of the second operand according to an identifier of a second filesink operator that references the second operand and a sequence number of a logical query plan tree on which the second filesink operator is located, where the second filesink operator is used for rewriting the data that is operated by the first filesink operator and that is corresponding to the second operand. In the subsequent process of executing the optimized query statement, data storage space indicated by the second operand is released according to the end active location of the second operand.

The data query server provided in this embodiment may be configured to perform the methods in Embodiment 1 and Embodiment 2. Specific implementation manners and technical effects thereof are similar to those of the methods, and details are not described herein.

The embodiment of the present invention further provides a computer program product for data processing, including a computer readable storage medium stored with program code, where an instruction included in the program code is used to execute the method process described in any one of the foregoing method embodiments. An ordinary person skilled in the art may understand that the foregoing storage medium may include any non-transitory machine-readable medium capable of storing program code, such as a Universal Serial Bus (USB) flash drive, a removable hard disk, a magnetic disk, an optical disc, a random-access memory (RAM), a solid state disk (SSD), or a non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present invention, claims, and features disclosed in the accompanying drawings may exist independently, or exist in a combination. Features described in a hardware form in the embodiments of the present invention may be executed by software, and vice versa. This is not limited herein. Additionally, statements made herein characterizing the invention refer to an embodiment of the invention and not necessarily all embodiments.

What is claimed is:

1. A batch data query method, comprising:
    receiving, by a data query server, N to-be-executed query statements, wherein N is a positive integer that is not less than 2;
    determining, by the data query server, symbol identifiers of operands in the N query statements according to operators and the operands in the N query statements, wherein the operators indicate to-be-performed operations, wherein the operands indicate storage locations of data to be operated on by the operators in the N query statements, wherein the symbol identifiers comprise version numbers of the operands, wherein operands indicating same data have a same version number, wherein operands indicating different data have different version numbers, and wherein the operators comprise at least a create operator, a destruct operator, a scan operator, and a filesink operator;
    determining, by the data query server, dependency among the N query statements according to the determined version numbers of the operands in the N query statements;
    performing, by the data query server, inter-query optimization on the N query statements according to the dependency among the N query statements and a preset optimization rule; and
    executing, by the data query server, an optimized query statement to obtain query results of the N query statements.

2. The method according to claim 1, wherein determining the symbol identifiers further comprises:
    obtaining N logical query plan trees corresponding to the N query statements, wherein one query statement corresponds to one logical query plan tree;
    adding a symbol identifier to an operand of a first-type operator on the N logical query plan trees, wherein the first-type operator comprises a create operator, a destruct operator, a scan operator, and a filesink operator; and
    performing the following operation on each of the N logical query plan trees: adding a symbol identifier to an operand of a second-type operator on a first logical query plan tree of the N logical query plan trees according to a topology sequence of the first logical query plan tree, a symbol identifier of an operand of a first-type operator on the first logical query plan tree, and a preset adding rule, wherein the second-type operator is an operator other than the first-type operator.

3. The method according to claim 2, wherein a root node of the first logical query plan tree comprises a filesink operator, wherein a leaf node of the first logical query plan tree comprises a scan operator, wherein an internal node of the first logical query plan tree comprises a second-type operator, a create operator, or a destruct operator, and wherein the internal node is a node other than the leaf node and the root node; and
    wherein the preset adding rule comprises: performing the following operation on each second-type operator on the first logical query plan tree:
        if an operand of a first second-type operator is the same as an operand of a left child node of the first second-type operator, adding, to the operand of the first second-type operator, a symbol identifier that is the same as a symbol identifier of the operand of the left child node of the first second-type operator; or
        if an operand of a first operator is the same as an operand of a right child node of the first operator, adding, to the operand of the first operator, a symbol identifier that is the same as a symbol identifier of the operand of the right child node of the first operator.

4. The method according to claim 1, wherein the preset optimization rule comprises at least one of the following rules:
    deleting a query statement having a same operand version number and a same operator as a first query statement of the N query statements;
    keeping a query sequence of query statements that have flow dependency, and optimizing multiple query statements that have flow dependency to a new query statement, wherein the flow dependency indicates that a version number of an operand of a filesink operator of a first query statement is the same as a version number of an operand of a second query statement to be executed subsequently to the first query statement; or
    combining query statements that have a same operator and overlapped operands.

5. The method according to claim 2, wherein the symbol identifiers of the operands in the N query statements further comprise a hot data identifier;
    wherein determining the symbol identifiers further comprises:
        collecting statistics of a quantity of times that an operand of each scan operator on the N logical query plan trees is referenced;
        determining whether the quantity of times that the operand of each scan operator on the N logical query plan trees is referenced is greater than a hot data threshold; and
        adding a hot data identifier to an operand that is of a scan operator on the N logical query plan trees and that is referenced for a quantity of times greater than the hot data threshold, wherein the hot data identifier indicates that data corresponding to an operand with the hot data identifier is hot data; and
    wherein the method further comprises: concurrently executing, in a process of executing the optimized query statement, optimized query statements that comprise the hot data identifier and that have no flow dependency or output dependency.

6. The method according to claim 2, wherein the symbol identifiers of the operands in the N query statements further comprise a start active location and an end active location;

wherein determining the symbol identifiers further comprises:

determining a start active location of a first operand of the operands in the N query statements according to an identifier of a scan operator that references the first operand for the first time and a sequence number of a logical query plan tree on which the scan operator is located; and determining an end active location of the first operand according to an identifier of a destruct operator for destructing the first operand and a sequence number of a logical query plan tree on which the destruct operator is located; and wherein the method further comprises: releasing, according to the end active location of the first operand in the process of executing the optimized query statement, data storage space indicated by the first operand.

7. The method according to claim 6, wherein determining the symbol identifiers further comprises:

determining a start active location of a second operand of the operands in the N query statement according to an identifier of a first filesink operator that references the second operand for the first time and a sequence number of a logical query plan tree on which the first filesink operator is located, wherein the first filesink operator is for writing data to a storage location indicated by the second operand; and determining an end active location of the second operand according to an identifier of a second filesink operator that references the second operand and a sequence number of a logical query plan tree on which the second filesink operator is located, wherein the second filesink operator is for rewriting the data that is operated on by the first filesink operator and that is corresponding to the second operand; and wherein the method further comprises: releasing, according to the end active location of the second operand in the process of executing the optimized query statement, data storage space indicated by the second operand.

8. A data query server, comprising:

a memory, configured to store N to-be-executed query statements;

a processor coupled to the memory and configured to:

receive the N to-be-executed query statements, wherein N is a positive integer that is not less than 2;

determine symbol identifiers of operands in the N query statements according to operators and the operands in the N query statements, wherein the operators indicate to-be-performed operations, wherein the operands indicate storage locations of data to be operated on by the operators in the N query statements, wherein the symbol identifiers comprise version numbers of the operands, wherein operands indicating same data have a same version number, wherein operands indicating different data have different version numbers, and wherein the operators comprise at least a create operator, a destruct operator, a scan operator, and a filesink operator;

determine dependency among the N query statements according to the determined version numbers of the operands in the N query statements;

perform inter-query optimization on the N query statements according to the dependency among the N query statements and a preset optimization rule; and execute an optimized query statement to obtain query results of the N query statements.

9. The data query server according to the claim 8, wherein determining the symbol identifiers further comprises:

obtaining N logical query plan trees corresponding to the N query statements, wherein one query statement corresponds to one logical query plan tree;

adding a symbol identifier to an operand of a first-type operator on the N logical query plan trees, wherein the first-type operator comprises a create operator, a destruct operator, a scan operator, and a filesink operator; and performing the following operation on each of the N logical query plan trees: adding a symbol identifier to an operand of a second-type operator on a first logical query plan tree of the N logical query plan trees according to a topology sequence of the first logical query plan tree, a symbol identifier of an operand of a first-type operator on the first logical query plan tree, and a preset adding rule, wherein the second-type operator is an operator other than the first-type operator.

10. The data query server according to the claim 9, wherein a root node of the first logical query plan tree comprises a filesink operator, wherein a leaf node of the first logical query plan tree comprises a scan operator, wherein an internal node of the first logical query plan tree comprises a second-type operator, a create operator, or a destruct operator, and wherein the internal node is a node other than the leaf node and the root node; and wherein the preset adding rule comprises: performing the following operation on each second-type operator on the first logical query plan tree:

if an operand of a first second-type operator is the same as an operand of a left child node of the first second-type operator, adding, to the operand of the first second-type operator, a symbol identifier that is the same as a symbol identifier of the operand of the left child node of the first second-type operator; or if an operand of a first operator is the same as an operand of a right child node of the first operator, adding, to the operand of the first operator, a symbol identifier that is the same as a symbol identifier of the operand of the right child node of the first operator.

11. The data query server according to the claim 8, wherein the preset optimization rule comprises at least one of the following rules:

deleting a query statement having a same operand version number and a same operator as a first query statement of the N query statements;

keeping a query sequence of query statements that have flow dependency, and optimizing multiple query statements that have flow dependency to a new query statement, wherein the flow dependency indicates that a version number of an operand of a filesink operator of a first query statement is the same as a version number of an operand of a second query statement to be executed subsequently to the first query statement; or combining query statements that have a same operator and overlapped operands.

12. The data query server according to the claim 9, wherein the symbol identifiers of the operands in the N query statements further comprise a hot data identifier;

wherein determining the symbol identifiers further comprises:

collecting statistics of a quantity of times that an operand of each scan operator on the N logical query plan trees is referenced;

determining whether the quantity of times that the operand of each scan operator on the N logical query plan trees is referenced is greater than a hot data threshold; and adding a hot data identifier to an operand that is of a scan operator on the N logical query plan trees and that is referenced for a quantity of times greater than the hot data threshold, wherein the hot data identifier indicates that data corresponding to an operand with the hot data identifier is hot data; and wherein the processor is further configured to: concurrently execute, in a process of executing the optimized query statement, optimized query statements that comprise the hot data identifier and that have no flow dependency or output dependency.

13. The data query server according to the claim 9, wherein the symbol identifiers of the operands in the N query statements further comprise a start active location and an end active location;

wherein determining the symbol identifiers further comprises:

determining a start active location of a first operand of the operands in the N query statements according to an identifier of a scan operator that references the first operand for the first time and a sequence number of a logical query plan tree on which the scan operator is located; and determining an end active location of the first operand according to an identifier of a destruct operator for destructing the first operand and a sequence number of a logical query plan tree on which the destruct operator is located; and wherein the processor is further configured to: release, according to the end active location of the first operand in the process of executing the optimized query statement, data storage space indicated by the first operand.

14. The data query server according to the claim 13, wherein determining the symbol identifiers further comprises:

determining a start active location of a second operand of the operands in the N query statement according to an identifier of a first filesink operator that references the second operand for the first time and a sequence number of a logical query plan tree on which the first filesink operator is located, wherein the first filesink operator is for writing data to a storage location indicated by the second operand; and determining an end active location of the second operand according to an identifier of a second filesink operator that references the second operand and a sequence number of a logical query plan tree on which the second filesink operator is located, wherein the second filesink operator is for rewriting the data that is operated on by the first filesink operator and that is corresponding to the second operand; and wherein the processor is further configured to: release, according to the end active location of the second operand in the process of executing the optimized query statement, data storage space indicated by the second operand.

15. A non-transitory computer-readable medium having processor-executable instructions stored thereon, the processor-executable instructions, when executed, facilitating performance of the following:

receiving N to-be-executed query statements, wherein N is a positive integer that is not less than 2;

determining symbol identifiers of operands in the N query statements according to operators and the operands in the N query statements, wherein the operators indicate to-be-performed operations, wherein the operands indicate storage locations of data to be operated on by the operators in the N query statements, wherein the symbol identifiers comprise version numbers of the operands, wherein operands indicating same data have a same version number, wherein operands indicating different data have different version numbers, and wherein the operators comprise at least a create operator, a destruct operator, a scan operator, and a filesink operator;

determining dependency among the N query statements according to the determined version numbers of the operands in the N query statements;

performing inter-query optimization on the N query statements according to the dependency among the N query statements and a preset optimization rule; and executing an optimized query statement to obtain query results of the N query statements.

16. The non-transitory computer-readable medium according to claim 15, wherein determining the symbol identifiers further comprises:

obtaining N logical query plan trees corresponding to the N query statements, wherein one query statement corresponds to one logical query plan tree;

adding a symbol identifier to an operand of a first-type operator on the N logical query plan trees, wherein the first-type operator comprises a create operator, a destruct operator, a scan operator, and a filesink operator; and performing the following operation on each of the N logical query plan trees:

adding a symbol identifier to an operand of a second-type operator on a first logical query plan tree of the N logical query plan trees according to a topology sequence of the first logical query plan tree, a symbol identifier of an operand of a first-type operator on the first logical query plan tree, and a preset adding rule, wherein the second-type operator is an operator other than the first-type operator.

17. The non-transitory computer-readable medium according to claim 16, wherein a root node of the first logical query plan tree comprises a filesink operator, wherein a leaf node of the first logical query plan tree comprises a scan operator, wherein an internal node of the first logical query plan tree comprises a second-type operator, wherein a create operator, or a destruct operator, and wherein the internal node is a node other than the leaf node and the root node; and wherein the preset adding rule comprises: performing the following operation on each second-type operator on the first logical query plan tree:

if an operand of a first second-type operator is the same as an operand of a left child node of the first second-type operator, adding, to the operand of the first second-type operator, a symbol identifier that is the same as a symbol identifier of the operand of the left child node of the first second-type operator; or if an operand of a first operator is the same as an operand of a right child node of the first operator, adding, to the operand of the first operator, a symbol identifier that is the same as a symbol identifier of the operand of the right child node of the first operator.

18. The non-transitory computer-readable medium according to claim 15, wherein the preset optimization rule comprises at least one of the following rules:
   deleting a query statement having a same operand version number and a same operator as a first query statement of the N query statements;
   keeping a query sequence of query statements that have flow dependency, and optimizing multiple query statements that have flow dependency to a new query statement, wherein the flow dependency indicates that a version number of an operand of a filesink operator of a first query statement is the same as a version number of an operand of a second query statement to be executed subsequently to the first query statement; or
   combining query statements that have a same operator and overlapped operands.

19. The non-transitory computer-readable medium according to claim 16, wherein the symbol identifiers of the operands in the N query statements further comprise a hot data identifier;
   wherein determining the symbol identifiers further comprises:
      collecting statistics of a quantity of times that an operand of each scan operator on the N logical query plan trees is referenced;
      determining whether the quantity of times that the operand of each scan operator on the N logical query plan trees is referenced is greater than a hot data threshold; and
      adding a hot data identifier to an operand that is of a scan operator on the N logical query plan trees and that is referenced for a quantity of times greater than the hot data threshold, wherein the hot data identifier indicates that data corresponding to an operand with the hot data identifier is hot data; and
   wherein the processor-executable instructions, when executed, further facilitate: concurrently executing, in a process of executing the optimized query statement, optimized query statements that comprise the hot data identifier and that have no flow dependency or output dependency.

20. The non-transitory computer-readable medium according to claim 15, wherein the symbol identifiers of the operands in the N query statements further comprise a start active location and an end active location;
   wherein determining the symbol identifiers further comprises:
      determining a start active location of a first operand of the operands in the N query statements according to an identifier of a scan operator that references the first operand for the first time and a sequence number of a logical query plan tree on which the scan operator is located; and
      determining an end active location of the first operand according to an identifier of a destruct operator for destructing the first operand and a sequence number of a logical query plan tree on which the destruct operator is located; and
   wherein the processor-executable instructions, when executed, further facilitate: releasing, according to the end active location of the first operand in the process of executing the optimized query statement, data storage space indicated by the first operand.

21. The non-transitory computer-readable medium according to claim 20, wherein determining the symbol identifiers further comprises:
   determining a start active location of a second operand of the operands in the N query statements according to an identifier of a first filesink operator that references the second operand for the first time and a sequence number of a logical query plan tree on which the first filesink operator is located, wherein the first filesink operator is for writing data to a storage location indicated by the second operand; and
   determining an end active location of the second operand according to an identifier of a second filesink operator that references the second operand and a sequence number of a logical query plan tree on which the second filesink operator is located, wherein the second filesink operator is for rewriting the data that is operated on by the first filesink operator and that is corresponding to the second operand; and
   wherein the processor-executable instructions, when executed, further facilitate: releasing, according to the end active location of the second operand in the process of executing the optimized query statement, data storage space indicated by the second operand.

* * * * *